(12) United States Patent
Park et al.

(10) Patent No.: US 8,050,560 B2
(45) Date of Patent: Nov. 1, 2011

(54) DISTRIBUTED RESOURCE SHARING METHOD USING WEIGHTED SUB-DOMAIN IN GMPLS NETWORK

(75) Inventors: Hyeon Park, Daejeon (KR); Byung Ho Yae, Daejeon (KR)

(73) Assignee: Electronics & Telecommunications Research Institute, Daejeon (KR)

(*) Notice: Subject to any disclaimer, the term of this patent is extended or adjusted under 35 U.S.C. 154(b) by 983 days.

(21) Appl. No.: 11/928,617

(22) Filed: Oct. 30, 2007

(65) Prior Publication Data

US 2008/0131123 A1     Jun. 5, 2008

(30) Foreign Application Priority Data

Dec. 1, 2006 (KR) .......... 10-2006-0120446
Sep. 21, 2007 (KR) .......... 10-2007-0096876

(51) Int. Cl.
*H04B 10/08* (2006.01)
*H04L 12/56* (2006.01)
*H04L 12/26* (2006.01)

(52) U.S. Cl. .......... 398/57; 398/5; 398/66; 398/67; 398/68; 398/69; 398/70; 398/71; 398/72; 398/73; 370/225

(58) Field of Classification Search ............ 398/57, 398/66–73
See application file for complete search history.

(56) References Cited

U.S. PATENT DOCUMENTS

| | | | | |
|---|---|---|---|---|
| 5,883,881 A * | 3/1999 | Croslin | .......... | 370/221 |
| 6,097,696 A * | 8/2000 | Doverspike | .......... | 370/216 |
| 6,314,092 B1 * | 11/2001 | Reeve | .......... | 370/351 |
| 6,631,128 B1 * | 10/2003 | Lemieux | .......... | 370/351 |
| 6,744,727 B2 * | 6/2004 | Liu et al. | .......... | 370/228 |
| 7,249,169 B2 * | 7/2007 | Blouin et al. | .......... | 709/220 |
| 7,352,692 B1 * | 4/2008 | Saleh et al. | .......... | 370/216 |
| 7,352,703 B2 * | 4/2008 | Elie-Dit-Cosaque et al. | | 370/237 |

(Continued)

FOREIGN PATENT DOCUMENTS

KR     2003-0067938     8/2003

(Continued)

OTHER PUBLICATIONS

Shared Risk Link Group (SRLG)-Diverse Path Provisioning Under Hybrid Service Level Agreements in Wavelength-Routed Optical Mesh Networks, Lu Shen et al., IEEE/ACM Transactions on Networking, vol. 13, No. 4, Aug. 2005.

(Continued)

*Primary Examiner* — Danny Leung
(74) *Attorney, Agent, or Firm* — Rabin & Berdo, P.C.

(57) ABSTRACT

A distributed resources sharing method using weighting factors of sub-domains in an optical network includes connecting working paths to an optical network according to a request of a subscriber, and calculating weighting factors for measurement of concentration of the sub-domains including the working paths by using information on connected working paths. The method also includes setting up the backup paths by using the weighting factors, and allocating resources in response to connection request at the time of setting up the backup path and sharing the allocated resources. With this method, it is possible to prevent a waste of idle resources caused from concentration of allocated resources. In addition, since the information of the idle resources in the network can be sensed at the time of selecting the backup paths by using a weight factor, the shared resources can be distributed, thereby maximizing efficiency of the resources.

4 Claims, 10 Drawing Sheets

U.S. PATENT DOCUMENTS

| | | | |
|---|---|---|---|
| 7,561,534 B2* | 7/2009 | Alicherry et al. | 370/255 |
| 7,783,194 B2* | 8/2010 | Hyndman et al. | 398/57 |
| 2002/0027885 A1* | 3/2002 | Ben-Ami | 370/254 |
| 2002/0071392 A1* | 6/2002 | Grover et al. | 370/241 |
| 2003/0058798 A1* | 3/2003 | Fleischer et al. | 370/238 |
| 2003/0198227 A1* | 10/2003 | Matsuura et al. | 370/395.2 |
| 2004/0205237 A1* | 10/2004 | Doshi et al. | 709/241 |
| 2005/0069314 A1* | 3/2005 | De Patre et al. | 398/5 |
| 2005/0097357 A1* | 5/2005 | Smith | 713/201 |
| 2005/0135809 A1* | 6/2005 | Vishnubhatt et al. | 398/66 |
| 2005/0195739 A1* | 9/2005 | Grover et al. | 370/225 |
| 2006/0140190 A1* | 6/2006 | Lee | 370/395.3 |
| 2006/0188252 A1* | 8/2006 | Schluter | 398/25 |
| 2008/0056717 A1* | 3/2008 | Niven-Jenkins et al. | 398/57 |
| 2008/0131123 A1* | 6/2008 | Park et al. | 398/66 |

FOREIGN PATENT DOCUMENTS

| | | |
|---|---|---|
| KR | 2006-0038970 | 5/2006 |
| KR | 2007-0060488 | 6/2007 |

OTHER PUBLICATIONS

A Disjoint Path Selection Scheme With Shared Risk Link Groups in GMPLS Networks, Eiji Oki et al., IEEE Communications Letters, vol. 6, No. 9, Sep. 2002.

Efficient Channel Reservation for Backup Paths in Optical Mesh Networks, Somdip Datta et al, Global Telecommunications Conference, 2001. GLOBECOM '01. IEEE, vol. 4, pp. 2104-2108.

* cited by examiner

| WP ID | Sub-domain IDs | SRLG List | Bp ID |
|---|---|---|---|
| Wp1 | B D F | b5 d2 f5 | Bp1 |
| Wp2 | B D F | b4 b5 d2 f5 | Bp2 |
| Wp3 | B D F | b6 d2 f5 | Bp3 |
| ...... | | | |

FIG. 2A

| BP ID | Sub-domain IDs |
|---|---|
| Bp1 | A C F |
| Bp2 | B D F |
| Bp3 | B E F |
| ...... | |

FIG. 2B

| Sub-domain IDs | SRLG | WP ID | BP ID | Weight |
|---|---|---|---|---|
| B | b5 | Wp1 | Bp1 | 0.34 |
| | b4 b5 | Wp2 | Bp2 | |
| | b6 | Wp3 | Bp3 | |
| C | c3 c4 c7 | Wp4 | Bp5 | 0.15 |
| | a6 a7 | Wp7 | Bp6 | |
| F | ...... | | | |

FIG. 2C

| Link ID | Sub-Domain ID | Wavelengths | Connections | |
|---|---|---|---|---|
| 1 | A | w1 | wp1 | |
| | | w2 | Bp1 | b4 b5 d2 f5 |
| | | w3 | Bp2 | c3 c6 d8 f3 f4 |
| 2 | A | w1 | B4 | c1 c4 f1 f2 |
| 3 | A | w2 | W5 | c1 c5 d9 d8 |

FIG. 3B

DISTRIBUTED RESOURCE SHARING METHOD USING WEIGHTED SUB-DOMAIN IN GMPLS NETWORK

CROSS-REFERENCE TO RELATED APPLICATIONS

This application claims the priority of Korean Patent Application No. 10-2006-120446 filed on Dec. 1, 2006 and No. 10-2007-96876 filed on Sep. 21, 2007 in the Korean Intellectual Property Office, the disclosure of which is incorporated herein by reference.

BACKGROUND OF THE INVENTION

1. Field of the Invention

The present invention relates to a distributed resources sharing method using weighted sub-domains in a generalized multi-protocol label switching (GMPLS) optical network, and more particularly, to a distributed resources sharing method of distributing shared resources by using information on weighted sub-domains in order to prevent waste of idle resources caused from concentration of allocated resources at the time of sharing resources of backup paths.

This work was supported by the IT R&D program of MIC/ITA [2005-S-101-02, Multimedia QoS Routing Technology Development].

2. Description of the Related Art

In a generalized multi-protocol label switching (GMPLS) optical network configured with optical cross connectors (OXCs), recovery time is longer than that of a synchronous optical network/synchronous digital hierarchy (SONET/SDH) network, so loss of traffic is very large. Therefore, there is needed a mechanism for survivability of the optical network. In addition, the mechanism needs to be operated so as to effectively use resources of the optical network.

Fiber obstacles in the optical network denote obstacles to all optical paths passing through a fiber. Each optical connection has a data rate of 10 Gbps. The optical connection in the GPLS optical network is implemented with a coarser granularity of 10 Gbps than an existing packet network (for example, a multi-protocol label switching (MPLS) network), so that loss of resources caused from the obstacle is increased. Therefore, utilization of connected resources in the optical network is more important than the existing network, and the mechanism for effectively using the resources of network is required. In an existing protection mechanism, other backup paths are selected by using only the shared risk link groups of the working paths, so that the recovery from the obstacle can be rapidly performed.

However, in the mechanism, the resources cannot be effectively used due to an insufficient method of sharing resources between the backup paths. In order to compensate for the shortcomings, a mechanism for sharing the resources between the backup paths has been proposed.

Although the efficiency of the resources can be improved by the mechanism, unbalanced sharing of the resources between the backup paths has not been considered. In other words, since the backup paths may be concentrated on one site, idle resources may not be used. Since the idle resources cannot be effectively used, the efficiency of the total resources is decreased.

As an example, there has been proposed a mechanism for minimizing network resource usage in terms of efficiency of the resources. The mechanism is based on an assumption that O-E-O (optical-electronic-optical) conversion in a mesh-type optical network is applied to some nodes but not all the nodes according to the status of system at the time of setting up optical connections (that is, light paths). Resources contention is caused from selection of the same resources t the time of setting up working paths or working/backup paths. In the existing mechanism, the network resources are minimized by considering signal quality, wavelength continuity, and path diversity for allocation of resources. However, similarly to the resource control mechanism where the O-E-O conversion is applied to all the nodes, the mechanism leads to concentration of the resources, so that the resources cannot be effectively controlled.

In an alternative example, there has been proposed a mechanism where available resources are firstly searched from a pool of resources at the time of setting up backup paths, and the resources are used for recovery. However, in the mechanism, a connection control method is not considered, so that the resource sharing is difficult in case of occurrence of concentration of backup paths.

SUMMARY OF THE INVENTION

An aspect of the present invention provides a distributed resources sharing method using weighted sub-domains in a GMPLS optical network capable of distributing shared resources to prevent a waste of idle resources caused from concentration of allocated resources so as to increase use efficiency of resources.

Another aspect of the present invention provides a distributed resources sharing method using weighted sub-domains in a GMPLS optical network capable of sensing information on idle resources in the network at the time of selecting backup paths for working paths allocated in advance with weighting factors of sub-domains in the network so as to maximize efficiency of resources.

According to an aspect of the present invention, there is provided a distributed resources sharing method using weighting factors of sub-domains in an optical network, comprising: connecting working paths to an optical network according to a request of a subscriber; calculating a weighting factor for measurement of concentration of the sub-domains including the working paths by using information on connected working paths and information on backup paths; setting up the backup paths by using the weighting factors; and allocating resources in response to connection request at the time of setting up the backup path and sharing the allocated resources.

Accordingly, since concentration of the working paths essentially leads to concentration of the backup paths at the time of setting up the backup paths by using only the information on the sub-domains of the working paths, it is possible to prevent a waste of idle resources caused from concentration of allocated resources. In addition, since the information of the idle resources in the network can be sensed at the time of selecting the backup paths for the previously allocated working paths by using a weight factor, the shared resources can be distributed, so that it is possible to maximize efficiency of the resources.

BRIEF DESCRIPTION OF THE DRAWINGS

The above and other aspects, features and other advantages of the present invention will be more clearly understood from the following detailed description taken in conjunction with the accompanying drawings, in which:

FIGS. 2A to 2C are views illustrating structures of data tables generated and managed by source nodes in connections according to an embodiment of the present invention;

FIGS. 3A and 3B are views illustrating configurations for setup of the backup path for the working path and resource management of each node in the GMPLS optical network;

DETAILED DESCRIPTION OF THE PREFERRED EMBODIMENT

Hereinafter, exemplary embodiments of the present invention will now be described in detail with reference to the accompanying drawings. The embodiments of the present invention may be modified in various forms, and the scope of the present invention is not limited to the embodiments. The embodiments of the present invention are provided in order that the ordinarily skilled in the art can have the better understanding of the present invention.

Figure 1:
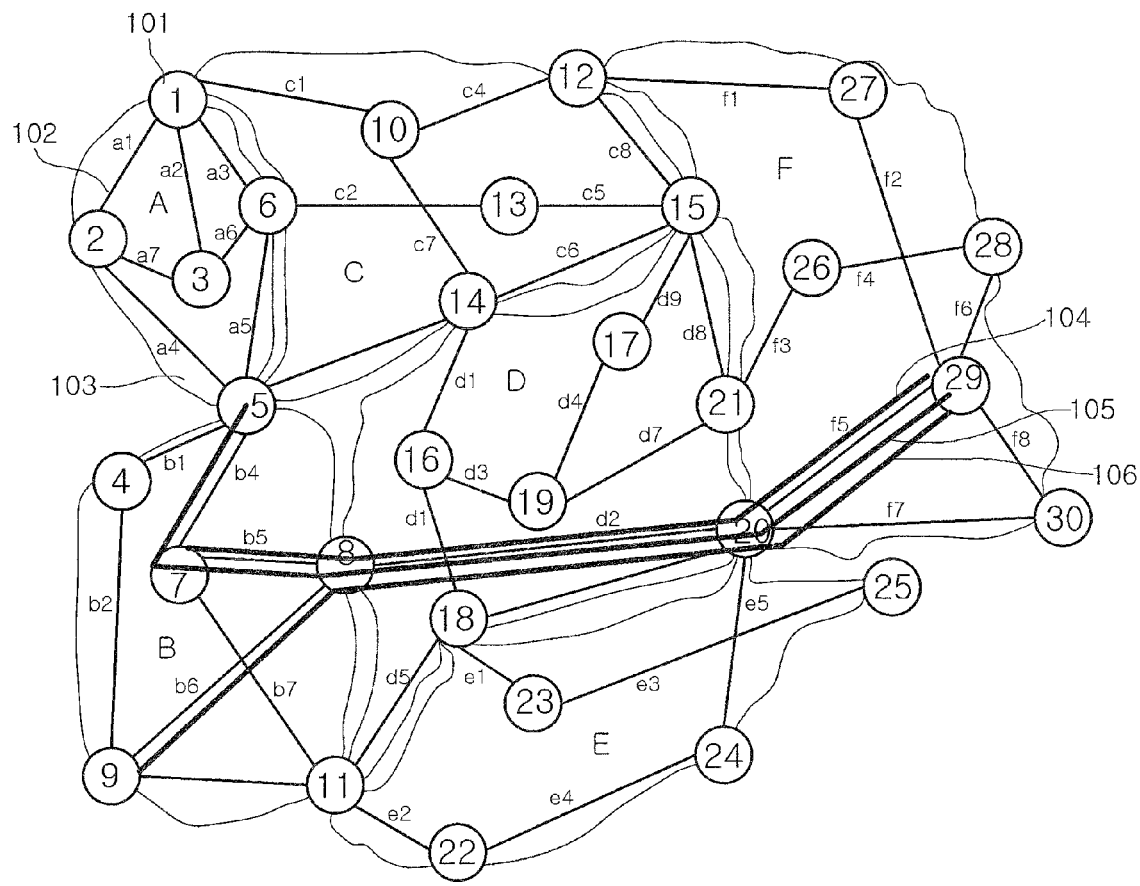
FIG. 1 is a view illustrating a configuration of an optical network including constraints for setting up backup paths according to the present invention.

In embodiments of the present invention, as an example of an optical network, a generalized multi-protocol label switching (GMPLS) optical network is employed. FIG. 1 is a view illustrating a configuration of an optical network including constraints for setting up backup paths according to the present invention.

Referring to FIG. 1, the GMPLS optical network includes, for example, 30 nodes 101. Shared risk link group (SRLGs) IDs 102 are allocated to links between the nodes 101 in order to set up links different from a working path at the time of setting up backup paths. In order to prevent concentration of the backup paths on one position in the GMPLS optical network, sub-domains 103 are formed in a form of network so as to set up the backup paths to the sub-domains same as those of the working path. Although the connection of the working paths is set up by using a shortest distance algorithm according to a user's request, the working paths may be concentrated as shown in FIG. 1, so that the backup paths may also be concentrated.

According to an embodiment of the present invention, a method of distributing resources by using weighted sub-domains is used so as to prevent concentration of the working paths and the backup paths in the GMPLS optical network. Details description thereof is made with reference to the accompanying drawings.

Figure 2B:
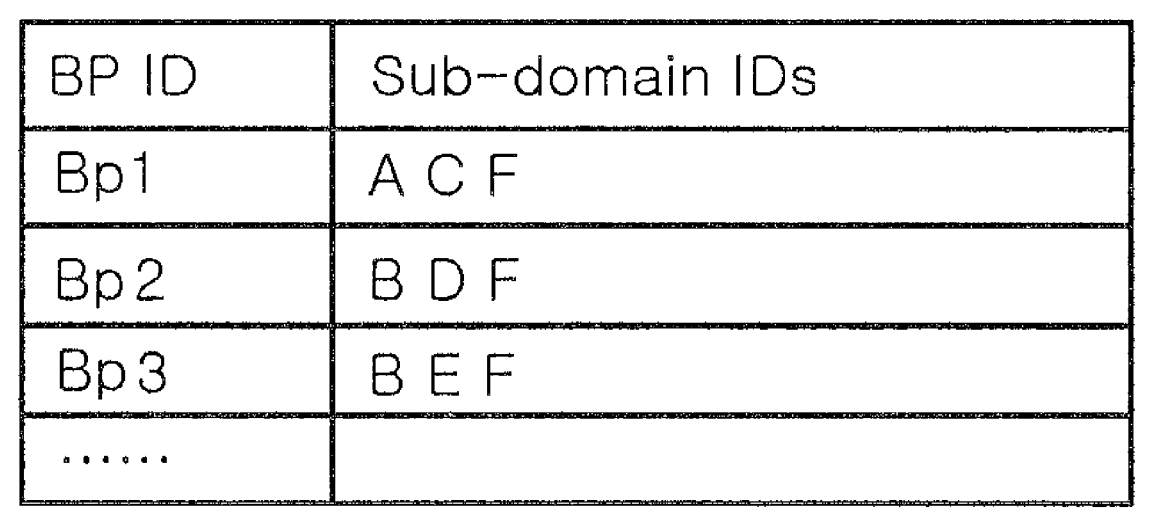

FIGS. 2A to 2C are views illustrating structures of data tables generated and managed by source nodes in connections according to an embodiment of the present invention.

At the source nodes, tables required for extracting and setting up the backup paths need to be managed. Data tables for managing the tables include a working path table, a backup path table, and a weighted sub-domain table.

As shown in FIG. 2A, the working path table needs to include working IDs (WP IDs), sub-domain IDs, SRLG lists, and associated backup path IDs (BP IDs) so as to select working paths and an SRLG-disjoint paths for extracting the backup paths. The working path table has a function as a pointer for the backup paths.

As shown in FIG. 2B, the backup path table includes backup path IDs (BP IDs) and sub-domain information.

As shown in FIG. 2C, the weighted sub-domain table includes sub-domain IDs, SRLG, working path IDs (WP IDs), backup path IDs (BP IDs), and weighting factors (Weight).

For the setup of backup paths, the backup paths are extracted by using weighting factors of the concentrated sub-domains with a solution in a case where there is concentration of working paths and a sub-domain list for SRLG and working paths. Therefore, after the sub-domains receive SRLGs included in the sub-domains as network pattern information. Every time when working path (WP) ID and the backup path (BP) ID are set up, the information is continuously added, so that it is calculated how large the connection to the sub-domains is concentrated. The concentration can be calculated by using a later-described weighting factor calculation algorithm.

Integer linear programming for minimizing to-be-used resources is described with reference to the following Equations 1 and 2.

$$\text{Objective: } \text{MIN} \sum_{sd} \sum_{ij} \sum_{w} B_{ijw}^{sd} \quad \text{[Equation 1]}$$

Subjects to:

$$R_i^{sdwg} - R_i^{sdwh} > 0, g \in G, \forall (g, h) \in G: g \neq h, 1 \leq h < g \leq G$$

$$R_i^{sdwg} - R_i^{sdwh} < 0, g \in G, \forall (g, h) \in G: g \neq h, 1 \leq g < h \leq G$$

$$\sum_{sd} \sum_{i} \sum_{w \in W} B_{iw}^{sd} \cdot \beta^w = P, P = \sum_{uv} \sum_{w} P_{uvw}^{sd}, \forall (i, j), i = s_b\, i \neq t_b\, j \neq s_b$$

$$\sum_{sd} \sum_{w} B_{ijw}^{sd} \leq L_{max} \cdot C_j, \forall (i, j), L_{max} = \text{int} \sum_{jw} B_{ijw}^{sd}$$

$$\sum_{j(i,j)} \sum_{w} B_{jiw}^{sd} \cdot \beta^w - \sum_{h(j,i)} \sum_{w} B_{jiw}^{sd} \cdot \beta^w = 0, \forall s, d, i \neq s_b, i \neq t_b$$

$$\sum_{j(i,j)} \sum_{w} B_{jiw}^{sd} \cdot \beta^w - \sum_{i(j,i)} \sum_{w} B_{jiw}^{sd} \cdot \beta^w = 1, \forall s, d, i = s_b, i \neq t_b$$

$$\sum_{j(i,j)} \sum_{w} B_{jiw}^{sd} \cdot \beta^w - \sum_{i(j,i)} \sum_{w} B_{jiw}^{sd} \cdot \beta^w = -1, \forall s, d, i \neq s_b, i = t_b$$

$$\sum_{sd} \sum_{w} B_{ijw}^{sd} \leq S_{ij}, S_{ij} = C_{ij} - \sum_{sd} \sum_{w} P_{ijw}^{sd}, \forall (i, j)$$

Equation 1 expresses a destination function so as to minimize the number of whole resources (wavelength).

In Equation 2, symbols $s_p$ and $t_p$ denote source and destination node (s, d) of a working path p. The symbol G denotes the maximum number of SRLGs in a network. The symbol w denotes resources (wavelength) of each link (i, j) and $1 \leq w \leq W$. The symbol $C_{ij}$ denotes a total capacity (total wavelength) of each link (i, j). The symbol $P_{uvw}^{sd}$ denotes a working path having wavelengths on the source and the destination node (s, d) and a link (u, v).

If a backup path of a working path (s, d) uses a wavelength w in link (I, j), the $B_{ijw}^{sd}$ is set to 1, and if not, the $B_{ijw}^{sd}$ is set to 0. The symbol $R_{ij}^{sdwg}$ denotes SRLG g of the working path of the backup path on the wavelength w at the link (i, j), and the symbol $\beta^w$ denotes a degree of sharing the wavelength w, that is, an inverse of the number of backup paths sharing the wavelength w. For example, if three backup paths share the wavelength w, the $\beta^w$ becomes ⅓. The symbol $S_{ij}$ denotes an idle capacity at the link (i, j), and the symbols $s_b$ and $t_b$ denote the source and destination node (s, d) of the backup path b.

The constraints a to d of the destination function of Equation 2 denote that, in a case where the link (i, j) is shared, any backup path having the source and destination node (s, d) must not have the same SRLG as that of the working paths thereof. Since the SRLG has a sequence of numbers, if two backup paths having the same SRLG, the same values exist in the SRLG list of the working paths of the two backup paths. If working paths commonly use an SRLG and there is an obstacle (failure) to the commonly used SRLG, the backup paths cannot protect the two working paths by using the shared resources.

The constraint e of the destination function of Equation 2 denotes that the number of working paths is equal to the number of backup paths. In other words, although there is a difference in length between paths, there always exist source and destination of the paths in the network.

The constraint f of Equation 2 denotes that the number of total wavelengths at the link (i, j) is larger than the number of total wavelength used in the backup path at the link (i, j). The constraint g (three equations) of Equation 2 denotes that the backup path is conserved in each link on the path. The constraint h of Equation 2 denotes that the idle resources at the link (i, j) are resources currently used as the working path among the entire resources of the link (i, j).

Now, setup of the backup path for the working path and resource management of each node in the GMPLS optical network are described with reference to FIGS. 3A and 3B.

Figure 3A:
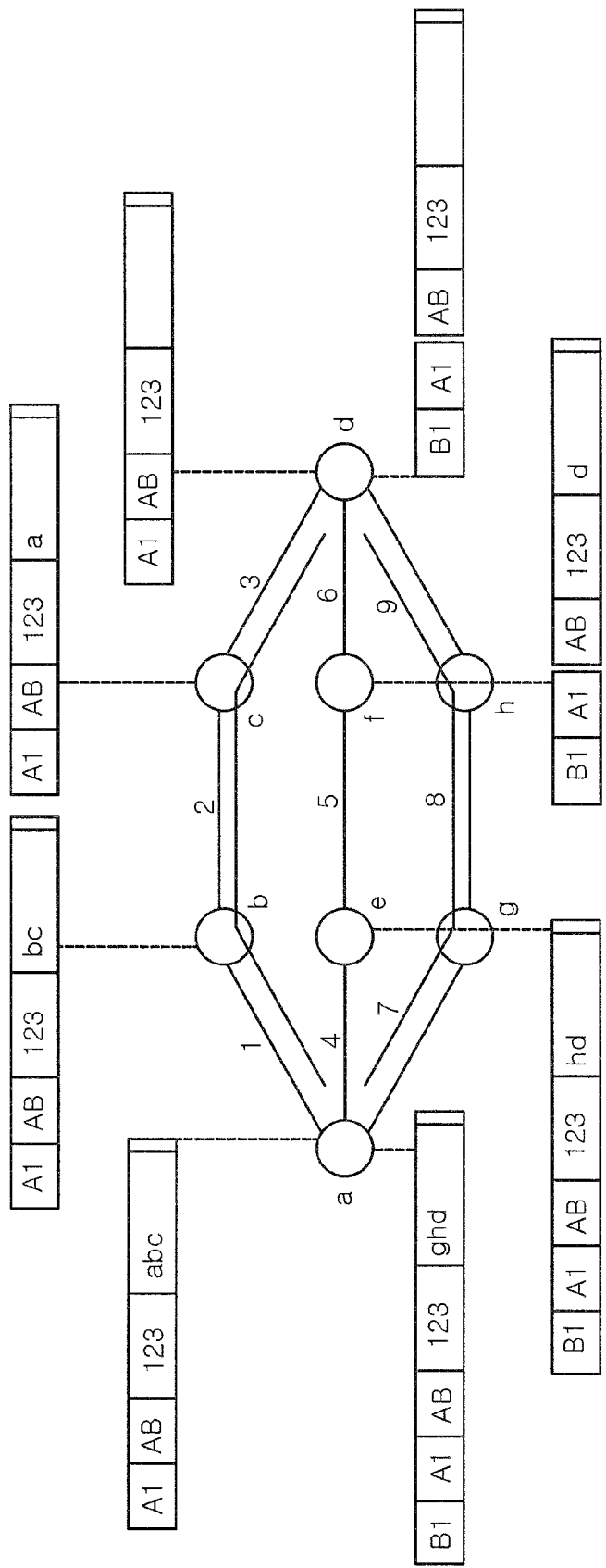

Referring to FIG. 3A, the source node of each connection extracts a route of the working path based on information acquired from each node. The extracted information includes information on sub-domains, SRLG list, and routes of the working path. The information is transmitted in a data format (A1, AB, 123, abc) of according to GMPLS signaling information.

In order to set up the backup path for the set-up working path, the sub-domains of the working path and SRLG-disjoined path setup are required. Therefore, after the extraction of the route of the backup path, data for determining resource sharing at each node is encoded in a form of data packet (B1, A1, AB, 123, ghd), and the encoded data is transmitted to each node on the backup path.

As shown in FIG. 3B, when the data packet is transmitted to each node, it is determined which resources are allocated with reference to the information listed on the resources management table, such as link IDs, sub-domain IDs including the nodes, resources (wavelengths) including links, connection paths sharing the resources, and associated SRLG information.

Figure 4:
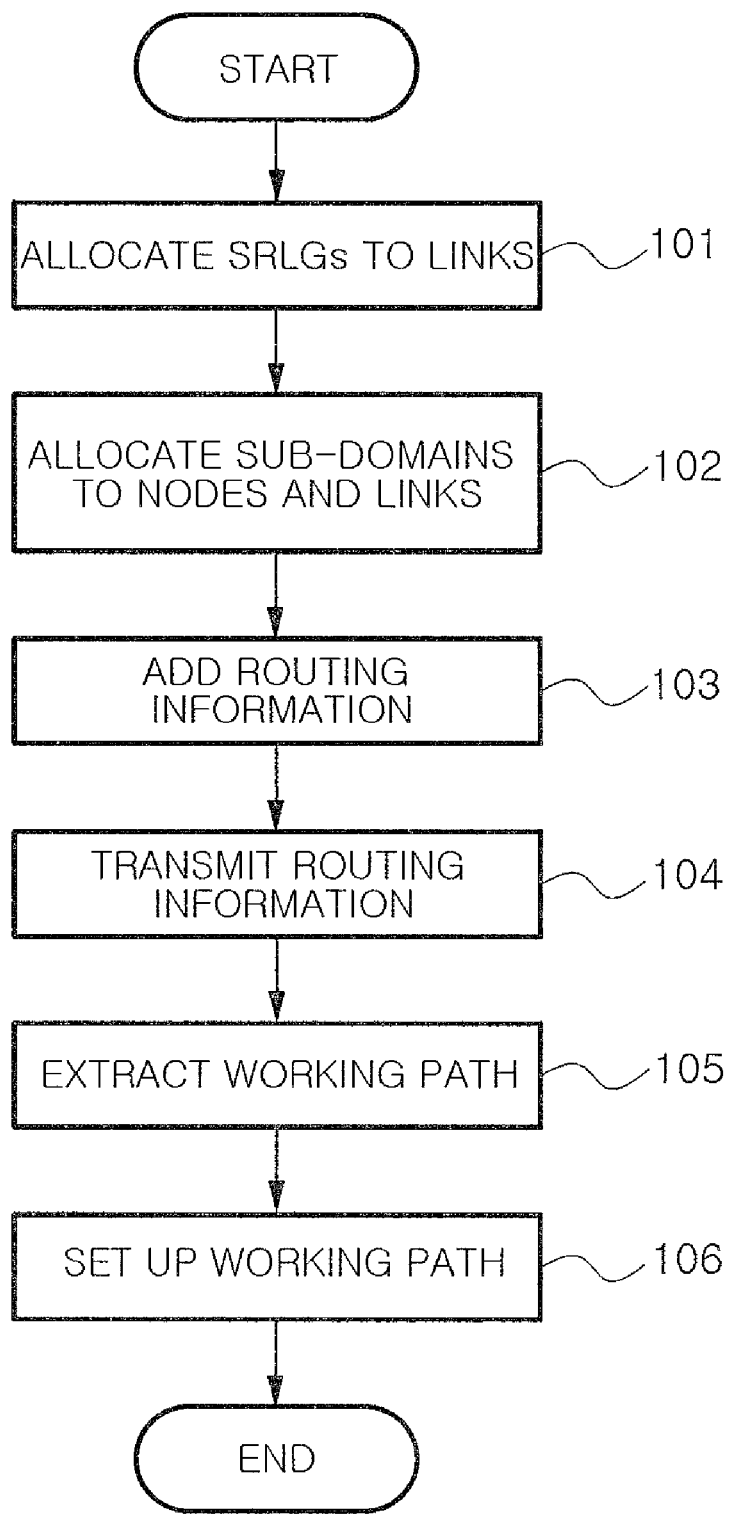
FIG. 4 is a flowchart illustrating a process of initializing network pattern information according to the present invention.

Now, a process of initializing network pattern information according to an embodiment of the present invention based on the aforementioned procedures is descried with reference to FIG. 4.

FIG. 4 is a flowchart illustrating the process of initializing network pattern information according to the present invention.

Referring to FIG. 4, in Step 101, each node allocates SRLGs to all the links in the network. In Step 102, in consideration of the number of links suitable for network design, the sub-domains IDs are allocated to the nodes or the links. In Step 103, each node adds routing information to a routing protocol to be a basis of extraction of working and backup paths. In Step 104, the network pattern information is transmitted to each node in the network.

Subsequently, in Step 105, each source node extracts the working paths in response to subscribers' request. In Step 106, setup information is transmitted to each node on the paths so as to set up the working paths.

Now, a process of calculating weighting factors for measurement of network concentration at each node in the GMPLS optical network is described with reference to FIG. 5.

Figure 5:
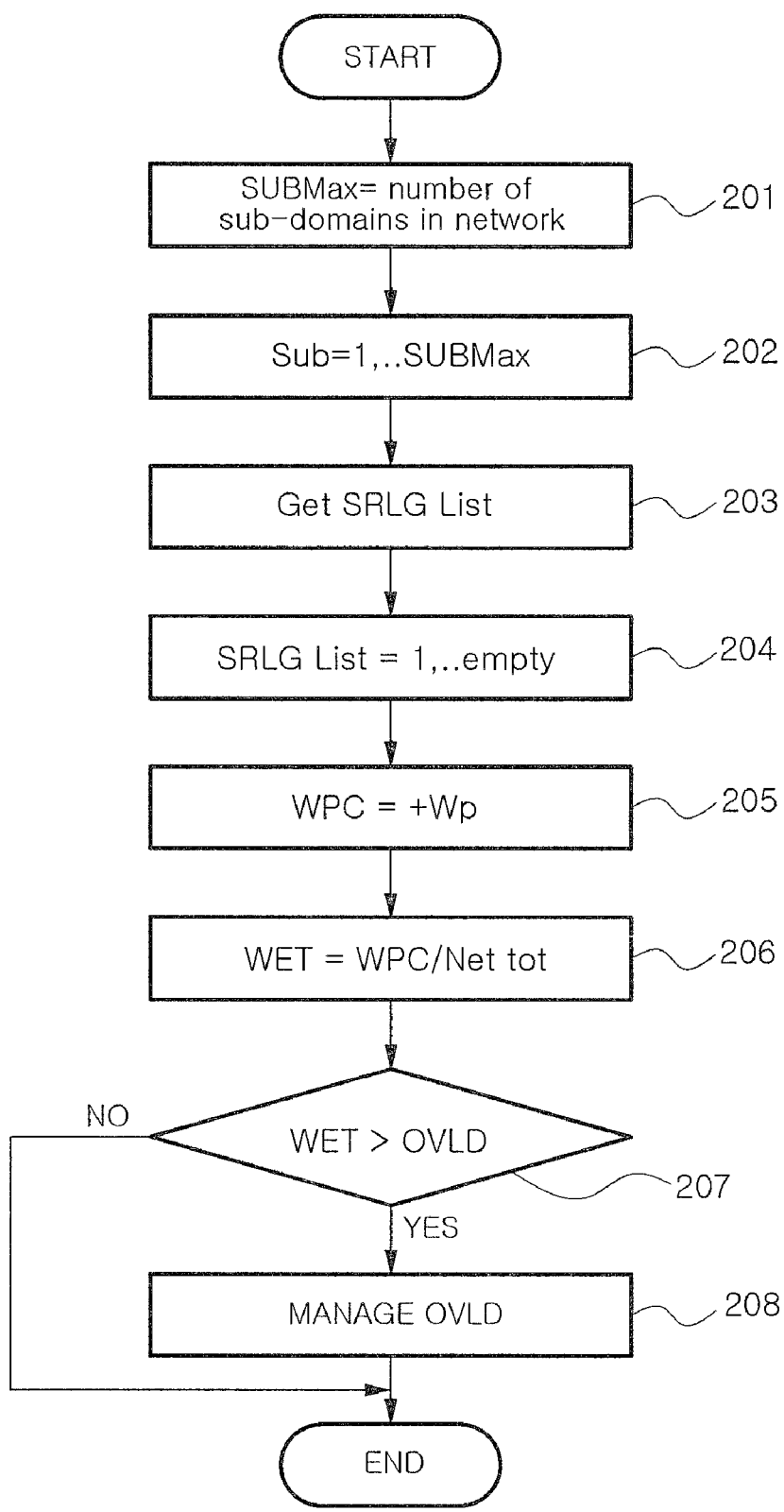
FIG. 5 is a flowchart illustrating a process of calculating weighting factors for measurement of network concentration according to an embodiment of the present invention.

FIG. 5 is a flowchart illustrating the process of calculating weighting factors for measurement of network concentration according to an embodiment of the present invention.

Referring to FIG. 5, in Step 201, each node allocates SRLG IDs to all links in the network, and after that, each node allocates the number of SRLGs so as to be optimized in one sub-domain, so that the number of sub-domains in the network is set to the maximum number of sub-domains (SUBMax=the number of sub-domains in the network).

Next, in Steps 202 and 203, each node receives the information of SRLGs including the sub-domains (Sub=1, . . . , SUBMax) as network pattern data (Get SRLG Lists).

In Steps 204 and 205, each node searches the working path table to check the SRLGs through which the paths pass and calculates the number of working paths used as resources in each sub-domain corresponding to the SRLGs (SRLG List=1, . . . empty). Since a sum of the number of user connections in the network, that is, the number of working paths and the number of corresponding backup paths becomes the total number of connections in the network, in Step 206, each node calculates the number of connections occupied by each sub-domain based on the calculated number of working paths.

Next, in Step 207, each node determines whether or not the number of connections exceeds idle resources uses suitable for using network resources. If the number of connections exceeds the idle resources uses, the corresponding sub-domain is managed as overloaded sub-domain. If not, only the weighting factor is stored.

Figure 6:
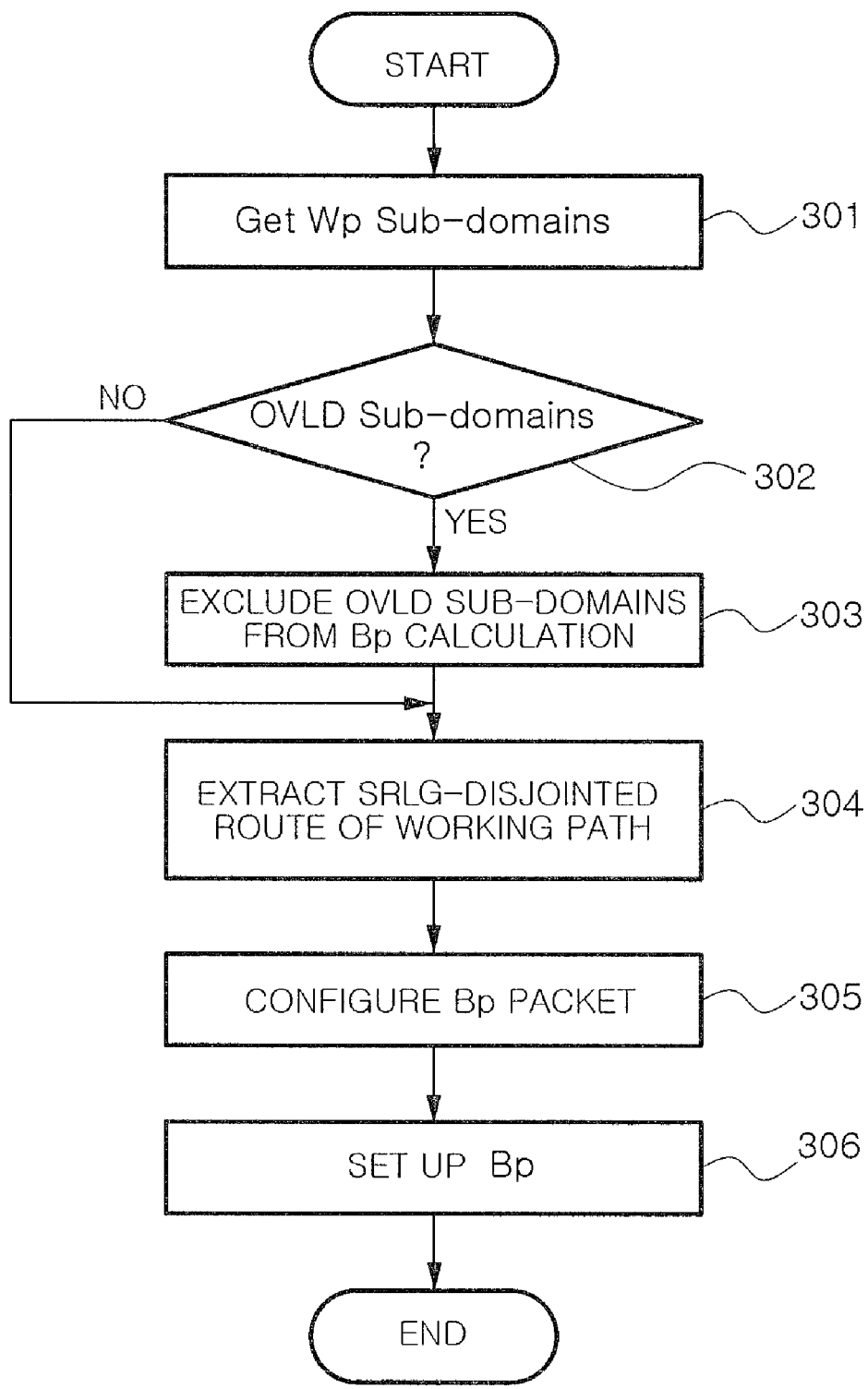
FIG. 6 is a view illustrating a process of selecting backup paths according to an embodiment of the present invention.

FIG. 6 is a view illustrating the process of selecting backup paths according to an embodiment of the present invention.

Referring to FIG. 6, in Step 301, each node in the GMPLS optical network extracts the sub-domain of the working path for selection of backup path based on the weighting factor of the sub-domain. In Step 302, each node determines whether or not there is an overloaded (OVLD) sub-domain. If there is an OVLD sub-domain, in Step 303, the sub-domain managed as the overloaded sub-domain is excluded from the extracted sub-domains at the time of setting up the backup path, and the backup paths are calculated for all the sub-domains. If there is no OVLD sub-domain, the method proceeds to Step 304.

In Step 304, each node extracts SRLG-disjointed routes of the working paths in the sub-domains. In Step 305, each node configures a packet for setting up the backup paths. Next, in Step 306, the information is transmitted to the next node for setting up the backup paths.

Finally, a process of allocating resources in response to a connection request of each node is described with reference to FIG. 7.

Figure 7:
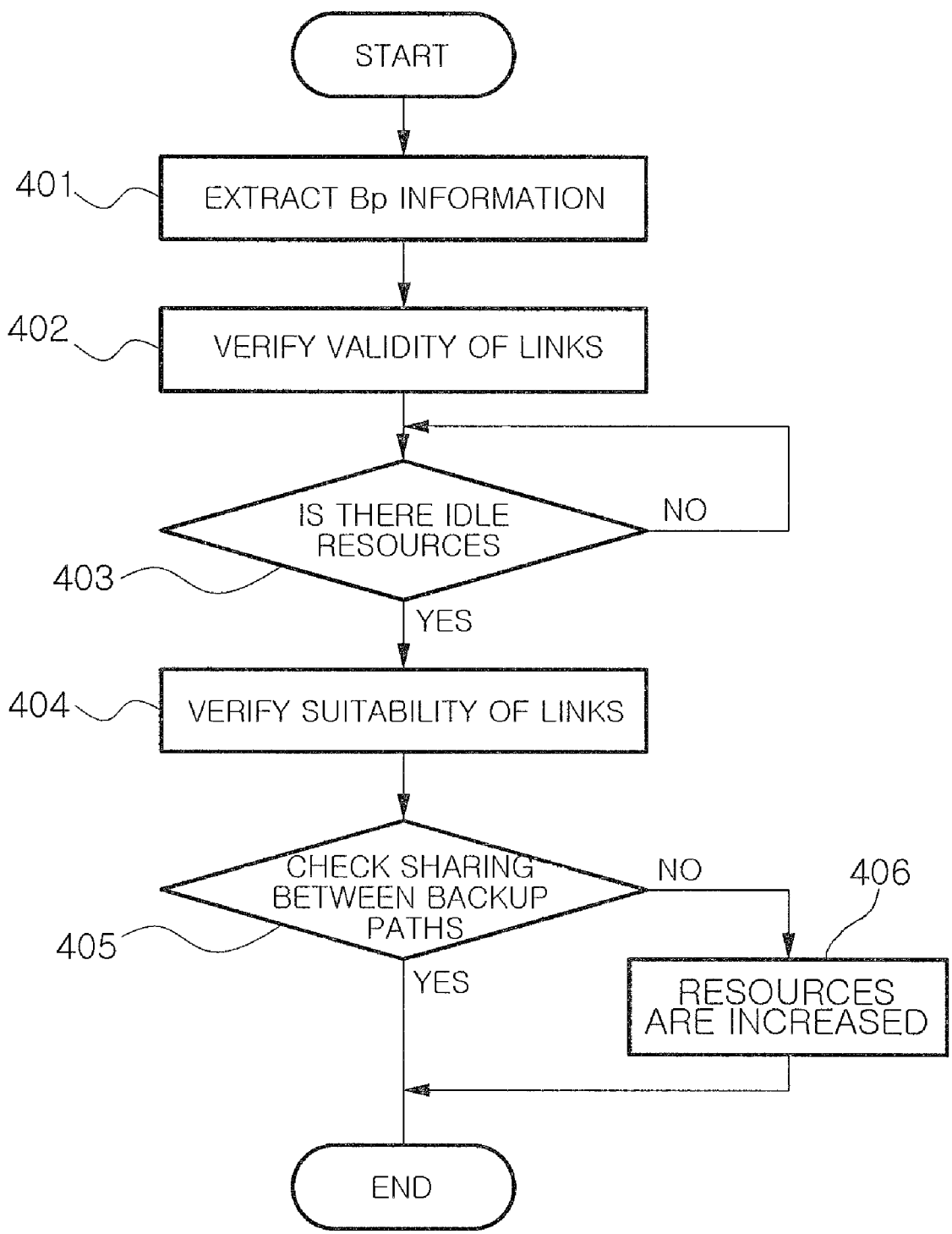
FIG. 7 is a view illustrating a process of allocating resources in response to a connection request of each node according to an embodiment of the present invention.

FIG. 7 is a view illustrating the process of allocating resources in response to a connection request of each node according to an embodiment of the present invention.

Referring to FIG. 7, in Step 401, when an input packet for the backup path is transmitted, one node in the sub-domain extracts backup path information. In Step 402, the node verifies a validity of each link which proceeds to the next node. In Step 403, the node determines in response to the connection request whether or not there are resources (wavelength) in the current link. If there are idle recourses, Step 404 is performed. If not, Step 403 is repeatedly performed until there are idle resources.

In Step 404, the node verifies the suitability of each link. In Step 405, the node checks whether or not there is a path having the same SRLG as the request backup path among the paths on the link in the SRLG of the working path thereof. In other words, the node checks sharing with other backup paths. As a result of the checking, if the sharing is available, the resources are shared. If not, in Step 406, the node is allocated with new resources to increase the resources thereof.

While the present invention has been shown and described in connection with the exemplary embodiments, it will be apparent to those skilled in the art that modifications and variations can be made without departing from the spirit and scope of the invention as defined by the appended claims.

What is claimed is:

1. A distributed resources sharing method using weighting factors of a plurality of sub-domains in an optical network, which includes a plurality of nodes and a plurality of links, comprising:
    connecting a working path from a source node to a destination node according to a request from a subscriber;
    calculating weighting factors of the sub-domains for measurement of concentration of the sub-domains including the working path by using information on the connected working path;
    setting up a backup path from the source node to the destination node by using the weighting factors; and
    allocating resources in response to a connection request at the time of setting up the backup path, and sharing the allocated resources, wherein the calculating the weighting factors for measurement of concentration of the sub-domains including the working paths comprises:
    setting up shared risk link groups for the links in the optical network, and then setting the number of the plurality of sub-domains in the optical network as a maximum number of sub-domains;
    receiving by each node, information on shared risk link groups corresponding to the sub-domains as a predetermined pattern;
    calculating the number of working paths that use resources of the shared risk link groups corresponding to each sub-domain;
    calculating the number of user connections occupied by each sub-domain in a total number of user connections in the optical network; and
    storing the calculated number of user connections as the weighting factor of each sub-domain.

2. The distributed resources sharing method of claim 1, further comprising, if the calculated number of user connections in a particular sub-domain exceeds a predetermined number of normal resource uses, managing the particular sub-domain as an overloaded sub-domain.

3. A distributed resources sharing method using weighting factors of a plurality of sub-domains in an optical network, which includes a plurality of nodes and a plurality of links, comprising:
    connecting a working path from a source node to a destination node according to a request from a subscriber;
    calculating weighting factors of the sub-domains for measurement of concentration of the sub-domains including the working path by using information on the connected working path;
    setting up a backup path from the source node to the destination node by using the weighting factors; and
    allocating resources in response to a connection request at the time of setting up the backup path, and sharing the allocated resources, wherein the setting-up the backup path by using the sub-domains comprises:
    extracting by a node, the sub-domains of the working path;
    determining whether or not each of the sub-domains of the working path is overloaded;
    extracting routes whose shared risk link groups are distinct from shared risk link groups of the working path, from all sub-domains excluding sub-domains managed as overloaded sub-domains from the extracted sub-domains;
    configuring packets for setting up the backup path through the extracted routes; and
    transmitting the configured packets to a next node to set up the backup path.

4. A distributed resources sharing method using weighting factors of a plurality of sub-domains in an optical network, which includes a plurality of nodes and a plurality of links, comprising:
    connecting a working path from a source node to a destination node according to a request from a subscriber;
    calculating weighting factors of the sub-domains for measurement of concentration of the sub-domains including the working path by using information on the connected working path;
    setting up a backup path from the source node to the destination node by using the weighting factors; and
    allocating resources in response to a connection request at the time of setting up the backup path, and sharing the allocated resources, wherein the allocating the resources in response to the connection request and the sharing of the allocated resources, comprise:
    receiving by a node on the backup path, packets of the backup path configured from different nodes;
    extracting information on the backup path from the received packets;
    if there are idle resources in each link of the backup path, determining whether or not each link of the backup path is sharable between the backup path and other backup paths;
    if the idle resources are sharable, sharing the idle resources of each link of the backup path; and
    if the idle resources are not sharable, allocating new resources to the node on the backup path.

* * * * *